Patented Jan. 13, 1931

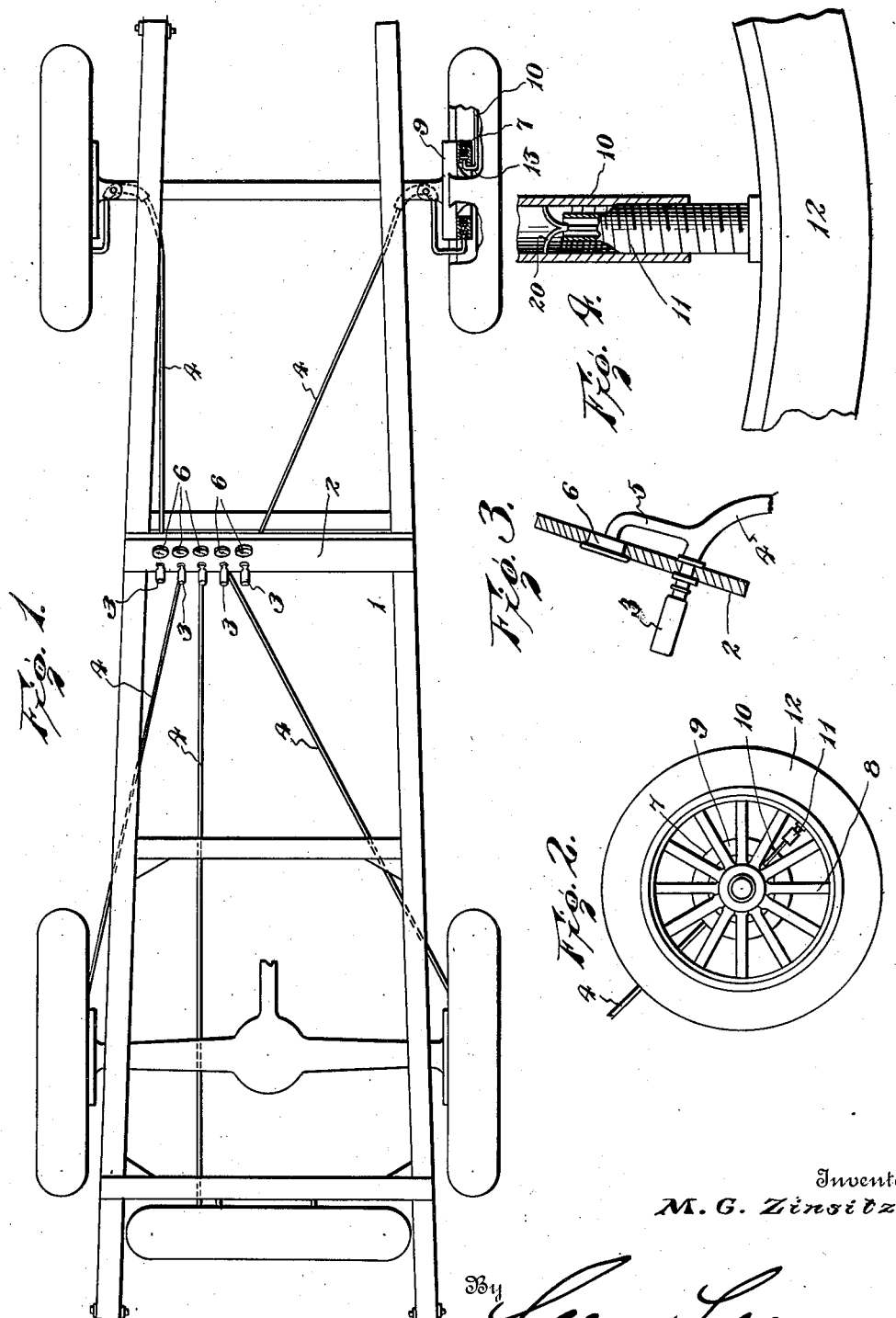

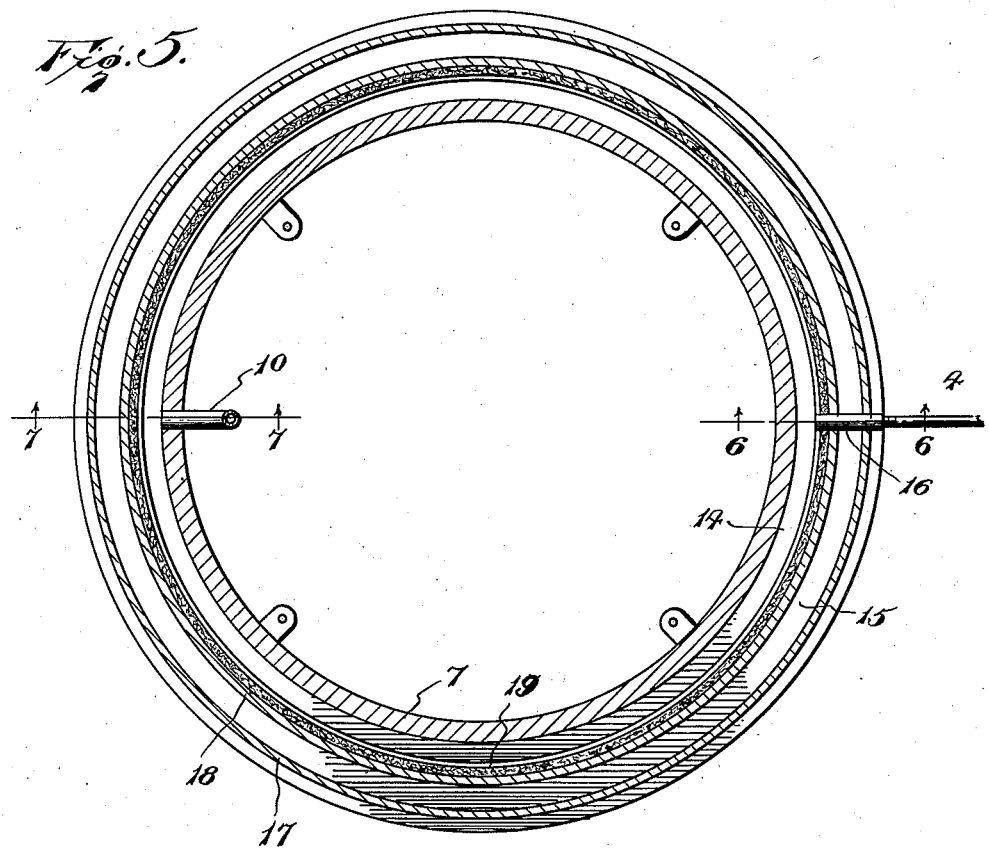

1,788,699

UNITED STATES PATENT OFFICE

MATTHEW G. ZINSITZ, OF BROOKFIELD, WISCONSIN

TIRE INFLATION

Application filed May 15, 1929. Serial No. 363,243.

This invention relates to means for inflating pneumatic tires and has for its primary object means whereby a tire may be inflated without requiring the operator of the vehicle to dismount. The invention also has for its object the provision of means controlled from the dash or instrument board of a vehicle for inflating any tire of the vehicle and also the provision of gages whereby the pressure in the tires may be noted by the operator. A further object of the invention is to provide a novel structure whereby the rotation of the wheel will be accommodated but the mechanism will always be in condition to inflate the tire. Other objects will appear incidentally in the course of the following description, and the invention resides in certain novel features which will be first fully described and then more particularly defined in the appended claims.

In the drawings:

Figure 1 is a plan view, partly broken away, of a portion of a motor vehicle having my improved inflation means mounted thereon.

Fig. 2 is a detailed elevation of a wheel showing the parts of the mechanism connected therewith, Fig. 3 is an enlarged detail section through the dash or instrument board, Fig. 4 is a sectional elevation of an inflation valve ordinarily mounted upon a tire, Fig. 5 is an enlarged longitudinal vertical section through an air cell by which the air is controlled and permitted to flow to the tire, Fig. 6 is an enlarged section on the line 6—6 of Fig. 5, Fig. 7 is an enlarged section on the line 7—7 of Fig 5, and Fig. 8 is an enlarged diametric section through the air cell showing an arrangement slightly different from that shown in Fig. 1.

In the drawings, the reference numeral 1 indicates an automobile chassis, and 2 the dash or instrument board which is a part of the completed vehicle. The motor and the gearing whereby the power of the motor is utilized to drive the vehicle are omitted from the drawings inasmuch as they form no part of the present invention and their presence in the drawings would merely tend to confuse. Mounted upon the dash or instrument board 2 is a series of inflation valves 3 which are shown conventionally and include a valve for each tire, including the spare tire which is generally mounted upon the back of the vehicle. Leading from each inflation valve to one of the tires is a tube 4 which transmits air under pressure from the valve to an air cell upon the wheel, as will be presently more specifically described. Immediately adjacent the instrument board, the tube 4 is formed with a branch 5 leading to a pressure gage 6 located upon the board immediately above the corresponding inflation valve so that the air pressure within the tube and the parts immediately connected therewith may be noted at any time.

The tube 4 leads to and into the outer periphery of a circular air drum or cell 7 which may be secured to the spokes 8 of a wheel or to the brake drum 9 which is usually provided to cooperate with the wheel. From the inner periphery of the air cell, a tube 10 leads to the usual inflation valve 11 mounted upon the wheel felly and connected with the tire 12 in the usual manner. In Figs. 1 and 7, the tube 10 is shown extending radially through the inner periphery of the air drum and given a bend, as at 13, so as to pass around and to the outer side of the drum in order to pass between the same and the spokes of the wheel and then extend to the tire valve, while in Fig. 8 the tube is shown as passing through the side of the air drum, the air drum in this instance being secured directly upon the periphery of the brake drum, whereas in Fig. 1 the air drum is secured to the side of the brake drum. Either arrangement may be adopted according to the formation and location of the brake drum, or the air cell may be secured to the wheel. The air drum is formed internally with an annular chamber 14 and the tube 10 opens directly into this chamber so that it forms a direct connection between the air chamber of the air drum and the valve carried by the tire, it being understood that the air drum rotates with the wheel and the brake drum. A radial passage or groove 15 extends outwardly from the chamber 14 and the tube 4 is provided with an extension or nipple 16 which extends through this radial groove or passage to deliver air into the chamber 14 and permit the air drum to rotate past said tube. Formed in the side walls of the groove or passage 15 are annular grooves receiving the edges of slides 17 and 18 which extend across the passage 15 and are fixed to the extension or nipple 16, as shown clearly in Fig. 6. Upon the inner side of the slide 18 is provided packing 19 of felt or other suitable material whereby leakage of air from the chamber 14 will be prevented and between the two slides oil or other matter may be placed in the passage 15 to further aid in preventing the leakage of air and also to lubricate the slides so that they may move easily relative to the air drum. The tube 10, as shown most clearly in Fig. 4, is equipped at its outer end with an internal pusher 20 which is adapted to engage the stem of the tire valve and thereby unseat the valve so that it will be opened to permit the flow of air into the tire. The back pressure exerted from the tire will be effective in the inflation valves 3 on the instrument board to close said valves and thereby retain the air in the system.

The apparatus is intended more particularly for use in inflating the tires from a public station, the machine being driven close to the supply of compressed air and the outlet tube from the storage tank being fitted over the inflation valve 3 and, consequently, opening said valves so that there will be a flow of air through the tube leading therefrom into the corresponding air drum and the tire connected therewith. It will thus be seen that any one of the tires may be quickly inflated without requiring removal of a tire valve cap as is now ordinarily required. The tire valve 11 with the present apparatus will always be opened and the valve 3, which is shown conventionally, may be of any approved form of inflation valve which will be held closed by the back pressure of the air in the system and will be opened whenever a hose or other supply tube is fitted thereto.

The air drum may be formed in sections to facilitate the assembling of the same with the slides and the joints between the sections calked in any approved manner, and it will be understood that one or more slides may be used as preferred and that antifriction balls or rollers may be provided to facilitate the free movement of the slide.

Having thus described the invention, I claim:

1. Tire inflating means comprising a drum to rotate with a wheel and tire carried thereby, said drum having an annular air chamber formed therein and an entrance slot leading from the chamber for the entire circumference thereof, circumferentially extending grooves being formed in the drum intermediate the depth of the slot and opening into the slot at opposite sides thereof, an annular band extending across said slot to close the slot, with its side portions engaged in said grooves, the band being adapted to turn in the drum, a nipple extending through said slot and band to communicate with said chamber, a supply pipe connected with the outer end of said nipple, and a pipe leading from said chamber out of said drum for delivering air from the drum to a tire.

2. Tire inflating means comprising a drum to rotate with a wheel and tire carried thereby, said drum having an annular air chamber formed therein and an entrance slot leading from the chamber for the entire circumference thereof, circumferentially extending grooves being formed in the drum and opening into the slot at opposite sides thereof, inner and outer annular bands extending across said slot with their side portions engaged in said grooves, the bands being adapted to turn in the drum, a packing ring having face to face contact with one band and engaged in the grooves occupied by the band, the portion of the slot between the bands being adapted to be filled with a lubricant constituting a sealing medium, a nipple extending through said slot and through the bands and packing ring to communicate with said chamber, a supply pipe connected with the outer end of said nipple, and a pipe leading from said chamber out of said drum for delivering air from the drum to a tire.

In testimony whereof I affix my signature.

MATTHEW G. ZINSITZ, [L. S.]